(12) United States Patent
Hata

(10) Patent No.: US 7,489,232 B2
(45) Date of Patent: Feb. 10, 2009

(54) ANTITHEFT DEVICE FOR A VEHICLE OR THE LIKE

(75) Inventor: Toshiaki Hata, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 216 days.

(21) Appl. No.: 10/697,049

(22) Filed: Oct. 31, 2003

(65) Prior Publication Data

US 2004/0239484 A1  Dec. 2, 2004

(30) Foreign Application Priority Data

May 27, 2003   (JP)   ............... 2003-149565

(51) Int. Cl.
*H04Q 1/00*   (2006.01)
*G05B 19/00*   (2006.01)

(52) U.S. Cl. ............... 340/5.72; 340/5.64; 340/426.11; 307/10.5

(58) Field of Classification Search ............... 340/5.72, 340/5.61, 5.21, 5.64, 426.11, 426.12; 180/287; 307/10.5; 123/179.2; 701/112
See application file for complete search history.

(56) References Cited

U.S. PATENT DOCUMENTS

| 4,583,148 | A | * | 4/1986 | Lipschutz | ............... 361/172 |
|---|---|---|---|---|---|
| 5,448,218 | A | * | 9/1995 | Espinosa | ............... 340/426.17 |
| 5,449,957 | A | * | 9/1995 | Carlo | ............... 307/10.3 |
| 5,708,307 | A | * | 1/1998 | Iijima et al. | ............... 307/10.5 |
| 6,140,914 | A | * | 10/2000 | Mueller et al. | ............... 340/426.13 |
| 6,414,586 | B1 | * | 7/2002 | Yoshizawa | ............... 340/5.2 |
| 6,914,516 | B2 | * | 7/2005 | Konno et al. | ............... 340/5.64 |
| 2002/0041125 | A1 | * | 4/2002 | Okamitsu et al. | ............... 307/10.5 |

FOREIGN PATENT DOCUMENTS

JP    4-15141 B2   3/1992

* cited by examiner

*Primary Examiner*—Edwin C Holloway, III
(74) *Attorney, Agent, or Firm*—Sughrue Mion, PLLC

(57) ABSTRACT

An antitheft device enables a vehicle to continue its operation without reexecuting information transmissions by referring to stored reception information when a power supply is instantaneously interrupted and recovered. The antitheft device includes an operation-equipment limiting part, a switch for sending a first ID code, an operation-equipment operation determining part that receives the first ID code and generates permission information for releasing a limited state of an operation equipment, a nonvolatile memory for storing the permission information, and an engine operation limiting part that permits the operation of the engine in response to the permission information, and limits the operation of the engine based on an operating condition of the engine. When the result of collation of the first ID code with a second ID code indicates coincidence, the operation-equipment operation determining part generates permission information to enable the operation equipment to operate, and makes the permission information stored in the nonvolatile memory.

11 Claims, 6 Drawing Sheets

ANTITHEFT DEVICE FOR A VEHICLE OR THE LIKE

BACKGROUND OF THE INVENTION

1. Field of the Invention

The present invention relates to an antitheft device applied to vehicles such as motor cars, motorcycles, motor ships, jet propulsion boats, etc., propelled by the driving force of an internal combustion engine, and more particularly, it relates to an antitheft device for a vehicle or the like capable of making re-collation of an ID code unnecessary at times such as when power is turned on again.

2. Description of the Related Art

In the past, in order to start the engine of a vehicle for instance, a key switch for engine starting is mechanically turned on by means of an original or qualified cylinder key which has been passed only to an authorized driver of the vehicle concerned. As a result, the starting of the engine becomes impossible without the qualified key, whereby theft of the vehicle can be prevented. However, even if the anti-theft of the vehicle is intended to be prevented by means of the qualified key alone, it is not necessarily able to provide a satisfactory anti-theft effect because it is relatively easy to reproduce the original or qualified key.

Thus, in recent years, there is proposed, for example, the following system for the purpose of strengthening such an anti-theft effect. That is, information for specifying a key dedicated to a vehicle concerned is sent from the key to a corresponding key cylinder of the vehicle so that the information sent from the key can be identified or verified at the key cylinder side, and only when the information is regular or qualified information, the starting of the vehicle engine is permitted (for instance, see a first patent document: Japanese examined patent application publication No. H04-15141).

In an antitheft device for a vehicle described in the above-mentioned first patent document, concretely speaking, an annular core is arranged around a key insertion hole in a key cylinder of the vehicle concerned, and a key coil wound on an axial core inside the key is placed in proximity of a rotor coil wound on the annular core to form a couple of magnetic circuits, through which information for driving the vehicle engine can be transmitted between the key and the key cylinder.

As described above, the conventional antitheft device for a vehicle depends solely upon information transmissions between the key and the key cylinder through the magnetic circuits. Therefore, when a power supply in the vehicle is interrupted instantaneously, it is necessary to reexecute the process of sending key identification information from the key to the key cylinder and the process of verifying the key identification information at the key cylinder side in a repeated manner, thus giving rise to a problem that information transmissions between the key and the key cylinder take time, thereby creating the possibility of causing trouble or impediment to the operation of the vehicle during traveling.

Particularly, in cases where equipment for sending key identification information from the key to the key cylinder has failed during traveling of the vehicle, generating an instantaneous interruption, there arises another problem that the vehicle gets stopped and becomes unable to continue traveling, making it impossible to arrive at a destination.

SUMMARY OF THE INVENTION

The present invention is intended to obviate the problems as referred to above, and has for its object to provide an antitheft device for a vehicle or the like in which when the result of collation and identification of a piece of information received at a vehicle side indicates regular or qualified information, the received information is stored so that when a power supply is instantaneously interrupted and then started or recovered again, the vehicle can continue to travel by referring to and verifying the information thus stored without reexecuting information transmissions.

Bearing the above object in mind, the present invention resides in an antitheft device for a vehicle which is propelled by a driving force of an engine. The antitheft device includes: an operation-equipment limiting part for limiting the operation of operation equipment for the vehicle through external operation; a first switch adapted to be turned on from the outside to send a first prescribed ID code; an operation-equipment operation determining part that receives the first ID code to generate permission information for releasing a limited state of the operation equipment caused by the operation-equipment limiting part; a nonvolatile memory for storing the permission information; and an engine operation limiting part that permits the operation of the engine in response to the permission information, and limits the operation of the engine based on an operating state of the engine. The operation-equipment operation determining part stores in advance a second ID code corresponding to the first ID code, collates the first ID code with the second ID code, and generates the permission information thereby to permit the operation of the operation equipment as well as to make the permission information stored in the nonvolatile memory, when the collation result of the first and second ID codes indicates coincidence therebetween.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Embodiment 1.

Hereinafter, a preferred embodiment of the present invention will be described in detail while referring to the accompanying drawings.

Figure 1:
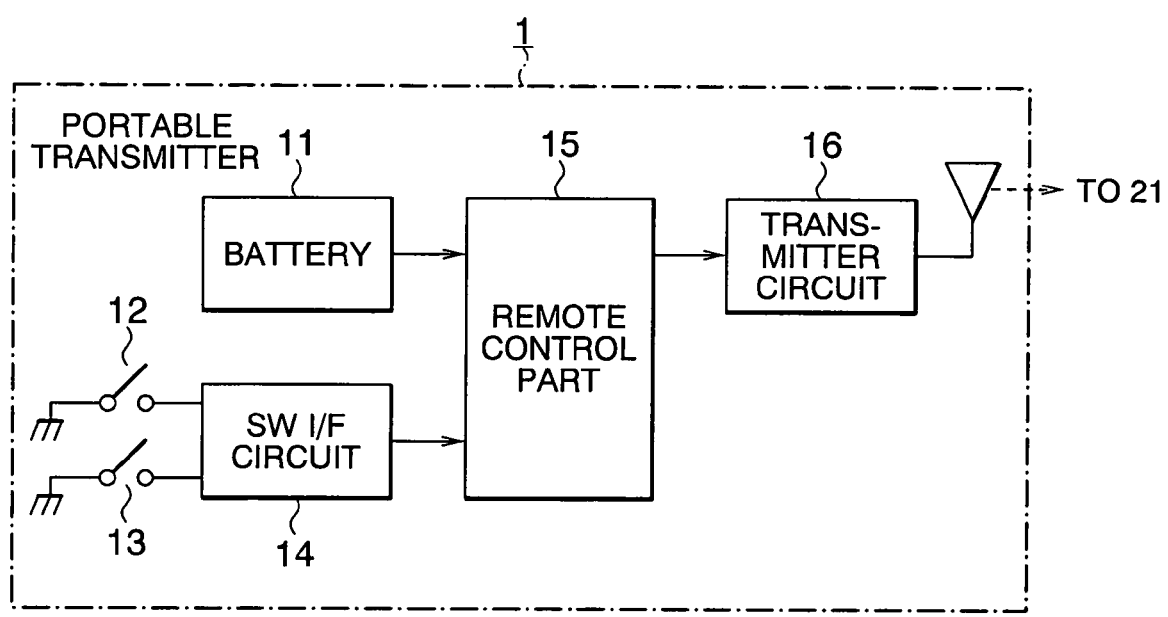
FIG. 1 is a view showing the construction of a portable transmitter according to one embodiment of the present invention.
Figure 2:
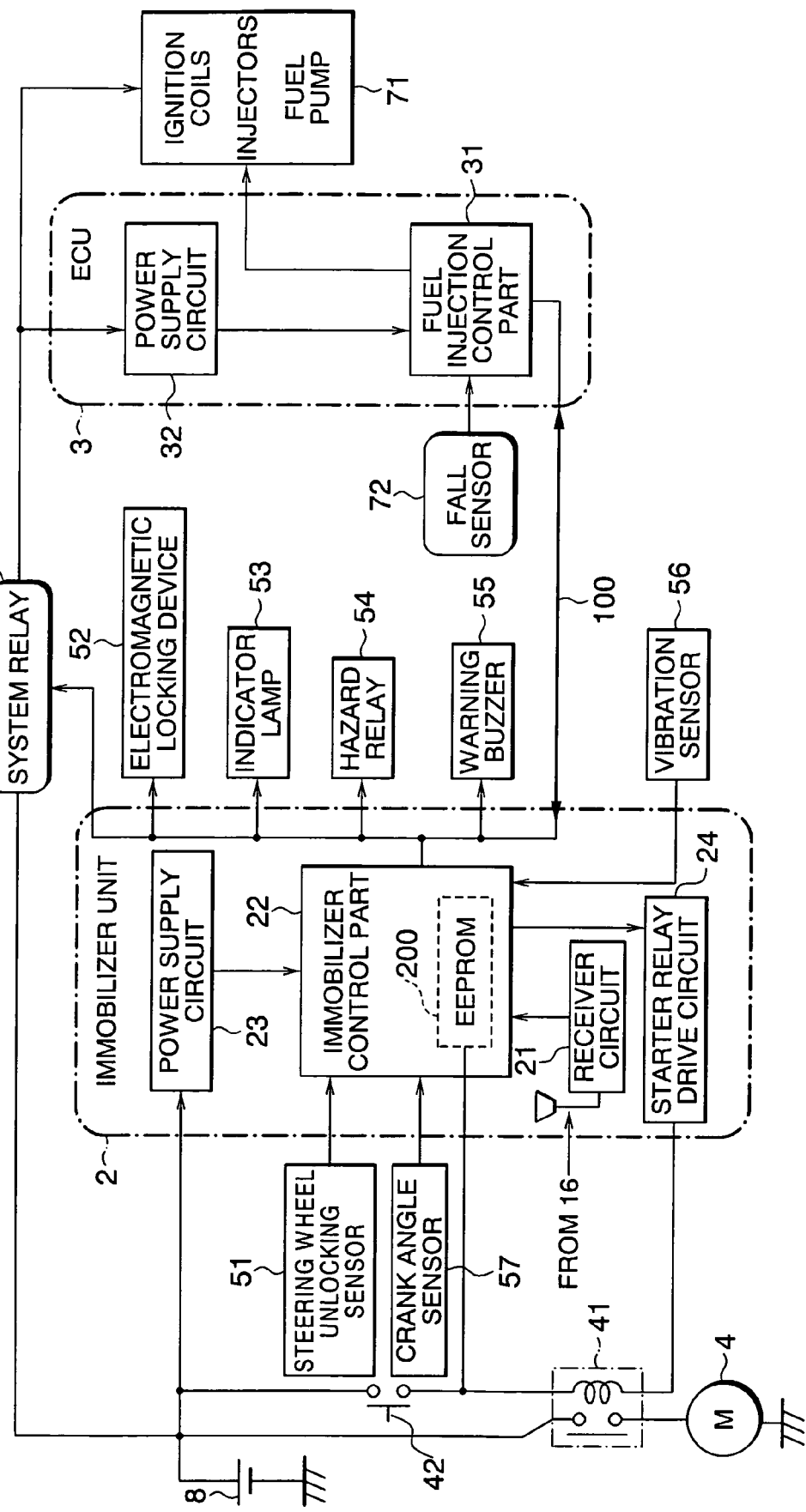
FIG. 2 is a block diagram showing the construction of a piece of vehicle-mounted equipment according to the embodiment of the present invention.
Figure 3:
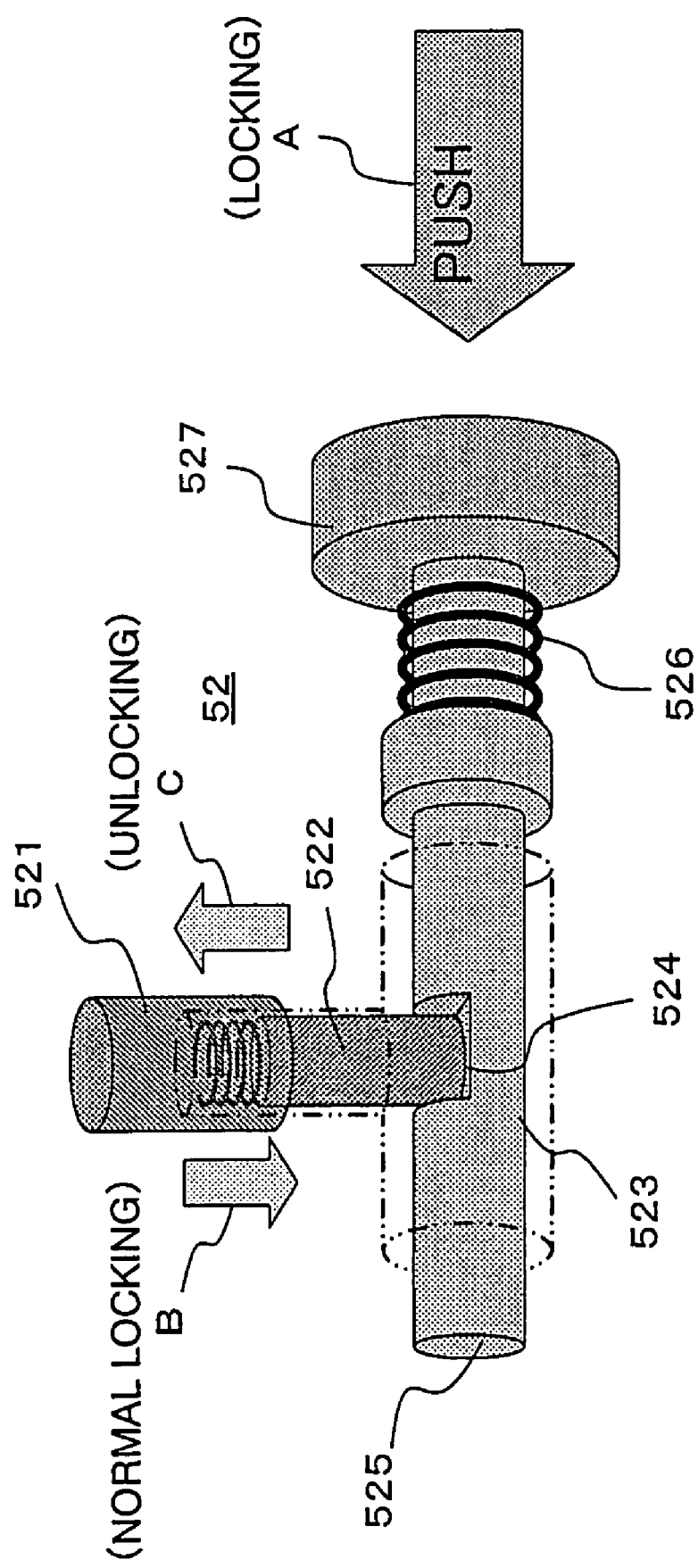
FIG. 3 is a perspective view showing the concrete construction of an electromagnetic locking device according to the embodiment of the present invention.

FIG. 1 and FIG. 2 are block diagrams that show the construction of one embodiment of the present invention. Here, reference will be made to an example in which an antitheft device of the present invention is applied to a two-wheeled vehicle or motor cycle. FIG. 1 shows the functional configuration of a portable transmitter that is controlled by a driver, and FIG. 2 shows the functional configuration of an immobilizer unit and an engine control unit (ECU) at a two-wheeled vehicle side. FIG. 3 is a perspective view that shows a concrete example of the construction of an electromagnetic locking device in FIG. 2.

In FIG. 1, the portable transmitter, generally designated at reference numeral 1 and integrally constructed with a remote controller main body, includes a power supply in the form of a battery 11, a first switch in the form of an unlock button 12 and a second switch in the form of a lock button 13 both adapted to be controlled by the driver, a switch interface (SW I/F) circuit 14, a remote control part 15, and a transmitter circuit 16 with an antenna.

The unlock button 12 serves as an operating switch for releasing the locking state of operation equipment (e.g., steering wheel, etc.), and sends a first prescribed ID code (for unlocking) to the two-wheeled vehicle side when it is turned on or depressed by the driver.

Also, the lock button 13 serves as an operating switch for locking the operation equipment, and sends a third prescribed ID code (for locking) to the two-wheeled vehicle side when it is turned on or depressed by the driver.

The SW I/F circuit 14 shapes the waveform of a transmission signal from the unlock button 12 or the lock button 13, and inputs it to the remote control part 15.

The remote control part 15 converts the input signal (first or third ID code) from the SW I/F circuit 14 into a signal corresponding to each ID code signal, and the transmitter circuit 16 sends the signal thus converted by the remote control part 15 to the two-wheeled vehicle side.

In FIG. 2, the immobilizer unit, generally designated at reference numeral 2, is powered from a vehicle-mounted battery 8. Also, the ECU, generally designated at reference numeral 3, and various actuators 71 (e.g., ignition coils, injectors, a fuel pump, etc.) are also powered by the vehicle-mounted battery 8 through a system relay 6, and a starter 4 is powered from the vehicle-mounted battery 8 through a starter relay 41. A starter switch 42, being controlled by the driver, is inserted between the vehicle-mounted battery 8 and an exciting coil of the starter relay 41.

The immobilizer unit 2 includes a receiver circuit 21 with an antenna, an immobilizer control part 22 for taking in a signal received by the receiver circuit 21, a power supply circuit 23 for supplying a power supply voltage from the vehicle-mounted battery 8 to the immobilizer control part 22, and a starter relay drive circuit 24 adapted to receive an engine starting permission or enable signal from the immobilizer control part 22 thereby to drive the starter relay 41.

The immobilizer control part 22 includes an EEPROM 200 functioning as a nonvolatile memory, in which are stored in advance a second and a fourth ID code (for comparison and collation) corresponding to the first and third ID codes, respectively.

In the immobilizer unit 2, the receiver circuit 21 receives the first ID code and the third ID code sent from the portable transmitter 1.

The immobilizer control part 22 serves to make a collation between the first ID code received by the receiver circuit 21 and the second ID code stored in advance in the EEPROM 200, and register the result of the collation in the EEPROM 200 when the collation result shows coincidence therebetween. At the same time, the immobilizer control part 22 sends an unlock signal for releasing the locking of the operation equipment (e.g., steering wheel) of the two-wheeled vehicle.

In addition, the immobilizer control part 22 also functions as an operation-equipment operation determining part for locking the operation equipment. That is, the immobilizer control part 22 collates the third ID code received by the receiver circuit 21 with the fourth ID code stored in advance in the EEPROM 200, deletes the result of the collation from the EEPROM 200 and locks the operation equipment when the collation result indicates coincidence therebetween.

Further, various devices are connected with the immobilizer control part 22. That is, a steering wheel unlocking sensor 51 for detecting the unlocked state of the steering wheel, an operation equipment limiting part in the form of an electromagnetic locking device 52 (see FIG. 3) for locking the steering wheel, an indicator lamp 53 for displaying a variety of items, a warning hazard relay 54 and a warning buzzer 55, and a vibration sensor 56 for detecting vibration of the body of the two-wheeled vehicle. A crank angle sensor 57, which serves to detect the number of revolutions per minute of the engine driven through the actuators 71, is also connected with the immobilizer control part 22.

The indicator lamp 53 displays a steering wheel unlocking abnormal state, a startup abnormal state of the ECU 3, a warning state at the time of theft, etc.

The hazard relay 54 performs an indication of warning or the like by lighting a hazard lamp (not shown) during operation of the immobilizer or at the time of theft. The warning buzzer 55 makes a warning by voice when an occurrence of theft is determined.

The vibration sensor 56 perceives the occurrence of theft by detecting the vibration of the two-wheeled vehicle body in an operation non-permission or inhibition state in which the operation of the engine is limited or inhibited.

The ECU 3 is provided with a fuel injection control part 31 for controlling the actuators 71 and a power supply circuit 32 for supplying electric power to the fuel injection control part 31.

A fall detection signal from a fall sensor 72 is input to the fuel injection control part 31 in the ECU 3, and detection signals from a variety of kinds of sensors (not shown), which detect the temperature of intake air, the temperature of engine cooling water, the amount of intake air, etc., required for engine control, are input to the fuel injection control part 31.

The fuel injection control part 31 also functions as an engine operation control part that limits the engine operation thereby to place the engine in a non-permitted or disabled condition. That is, it controls the actuators 71 such as ignition coils, injectors, a fuel pump, etc., based on the operating condition of the engine (not shown), the fall detection signal representative of the falling state of the two-wheeled vehicle, and the like.

The power supply circuit 32 supplies a power supply voltage from the vehicle-mounted battery 8 to the fuel injection control part 31.

The immobilizer unit 2 and the ECU 3 are connected with each other through a communications line 100 so that two-way or bidirectional communications of a variety of pieces of information can be made therebetween.

In FIG. 2, when the starter switch 42 is turned on by the driver, the system relay 6 is driven to start the ECU 3.

The system relay 6 is connected with the immobilizer control part 22 in the immobilizer unit 2 so as to form an engine operation limiting part, as in the case of the fuel injection control part 31 in the ECU 3, which serves to permit the engine operation in response to the result of collation between the immobilizer control part 22 and the ECU 3 through the communications line 100.

When the engine operation is permitted by a piece of permission information, the immobilizer control part 22 actuates the starter relay drive circuit 24, whereby the starter relay 41 is in turn actuated to start the starter 4.

In FIG. 3, for instance, the electromagnetic locking device (operation equipment limiting part) 52 for locking the steering wheel of the two-wheeled vehicle includes an electromagnetic solenoid 521 that is excited upon unlocking of the steering wheel, a stopper 522 that acts as an operating part of the electromagnetic solenoid 521, a lock bar 523 being engageable with the stopper 522, an engaging portion 524 in the form of a concave portion formed on the central upper surface of the lock bar 523, an operating end 525 of the lock bar 523, a spring 526 for urging the lock bar 523 in its unlocking direction (i.e., to the right in FIG. 3), and a steering wheel lock button 527 that acts as an operation portion of the lock bar 523.

Now, reference will be made to the locking operation and the unlocking operation of this embodiment while referring to FIG. 1 through FIG. 3.

In ordinary time, the driver having gotten off the two-wheeled vehicle operates the steering wheel lock button 527 in the direction of arrow A, whereby the operating end 525 of the lock bar 523 is brought into engagement with a rotary member (not shown) of the steering wheel to lock the steering wheel against rotation. At this time, the stopper 522 is urged in the direction of arrow B by an unillustrated compression spring inside the electromagnetic solenoid 521 so as to be inserted into the engaging portion 524, thereby holding the locking state of the lock bar 523.

Subsequently, when the driver uses the two-wheeled vehicle which is in its locked state, the driver turns on the unlock button 12 of the portable transmitter 1.

As a result, a first ID code for unlocking the steering wheel is sent to the immobilizer unit 2 of the two-wheeled vehicle through the SW I/F circuit 14, the remote control part 15 and the transmitter circuit 16 in the portable transmitter 1.

The first ID code is received by the receiver circuit 21 in the immobilizer unit 2 so that it is collated with the second ID code stored in advance in the EEPROM 200 of the immobilizer control part 22.

If the first and second ID codes coincide with each other as a result of the collation, the electromagnetic locking device 52 is released, and a piece of permission information for permitting the operation of the steering wheel is generated by the immobilizer control part 22.

As a consequence, exciting electric power is supplied to the electromagnetic solenoid 521 whereby the stopper 522 engaged with the engaging portion 524 of the lock bar 523 is brought into disengagement therefrom in the direction of arrow C.

Accordingly, the lock bar 523 together with the steering wheel lock button 527 is moved in a releasing or unlocking direction (i.e., to the right in FIG. 3) under the action of a restoration force of the spring 526, whereby the operating end 525 of the lock bar 523 is placed out of engagement with an engaging portion of a steering wheel rotating part so as to be unlocked therefrom.

Here, note that a repeated steering wheel locking operation is carried out manually by the driver's pressing of the steering wheel lock button 527, as previously stated.

Next, a concrete explanation will be made of the processing operation of the immobilizer unit 2 and the ECU 3 until the driver releases the locking of the steering wheel so as to start the engine (i.e., from a standby mode to an engine operation permission mode through an operation shift mode) while referring to a flow chart of FIG. 4.

Figure 4:
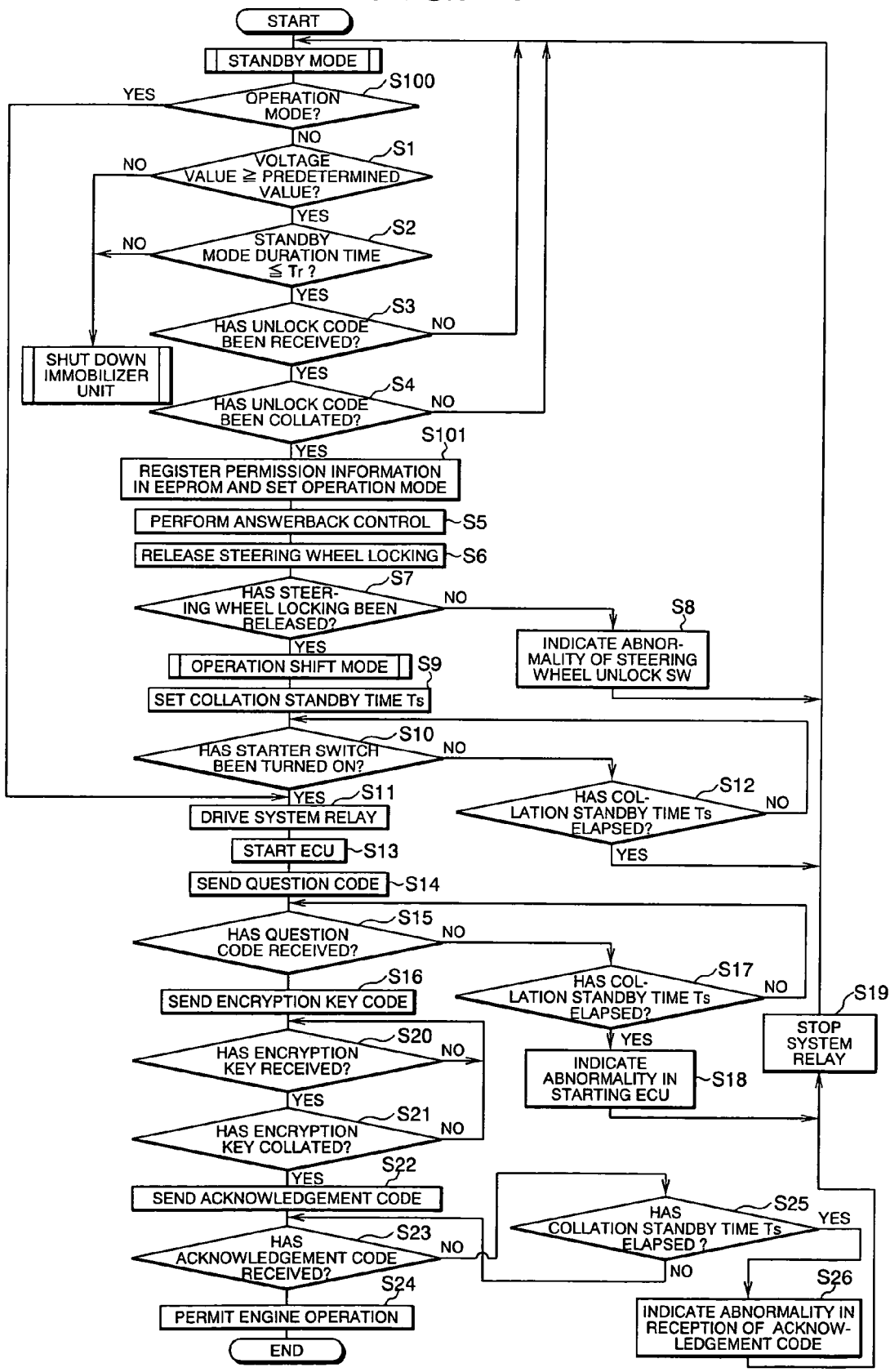
FIG. 4 is a flow chart showing a processing operation of the vehicle-mounted equipment according to the embodiment of the present invention.

In FIG. 4, first of all, the immobilizer unit 2 is in a standby mode, and it is determined whether the current vehicle operation information registered in the EEPROM (nonvolatile memory) indicates a vehicle operation mode (step S100).

When it is determined in step S100 that the current vehicle operation information indicates the operation mode (that is, YES), the control flow shifts to a processing of driving the system relay 6 so as to operate the two-wheeled vehicle (step S11).

On the other hand, when it is determined that the current vehicle operation information indicates an out-of-operation mode (that is, NO), a further determination is made as to whether the power supply voltage value of the vehicle-mounted battery 8 is higher than or equal to a prescribed value (i.e., a voltage value high enough for engine starting)(step S1).

When the power supply voltage value is determined to be lower than the prescribed value in step S1 (that is, NO), it is decided that the capacity of the vehicle-mounted battery 8 is insufficient for starting the engine, so the immobilizer unit 2 is shut down as it is, and the processing routine of FIG. 4 is ended.

On the other hand, when the voltage value of the vehicle-mounted battery 8 is determined to be higher than or equal to the prescribed value (that is, YES), it is further determined whether the duration time of the standby mode (i.e., the state in which the power supply of the immobilizer unit 2 is turned on) is within a predetermined time Tr (step S2).

When the duration time of the standby mode is determined to exceed the predetermined time Tr in step S2 (that is, NO), the immobilizer unit 2 is shut down for safety as it is, and the processing routine of FIG. 4 is ended.

In addition, when the duration time of the standby mode is determined to be within the predetermined time Tr (that is, YES), a determination is made as to whether the receiver circuit 21 of the immobilizer unit 2 has received the first ID code (UNLOCK code) for unlocking of the steering wheel sent by the driver's pressing the unlock button 12 of the portable transmitter 1 (step S3).

When it is determined that the first ID code has not been received in step S3 (that is, NO), the immobilizer unit 2 returns to the standby mode in which it repeats the above-mentioned processing (step S100).

On the other hand, if it is determined that the first ID code has been received (that is, YES), the received first ID code is collated with the second ID code stored in advance in the EEPROM 200 in the immobilizer control part 22 to determine whether they coincide with each other (step S4).

When it is determined, as a result of the collation in step S4, that both of the codes do not coincide with each other (that is, NO), the immobilizer unit 2 returns to the standby mode in which it repeats the above-mentioned processing (step S100), whereas when both of the codes are determined to coincide with each other (that is, YES), it is decided that the operation mode is permitted, and the permission information is registered in the EEPROM 200, thereby setting the operation mode (step S101).

Then, the hazard relay 54 or the warning buzzer 55 is driven, and answerback control is carried out for informing the driver of the fact that the collation result is in coincidence (step S5).

Subsequently, a steering wheel unlocking command (i.e., permission information) is generated (step S6), and it is determined based on a detection signal from the steering wheel unlocking sensor 51 whether the electromagnetic locking device 52 for locking the steering wheel has performed an unlocking operation normally (step S7).

When it is determined in step S7 that the steering wheel locking has not yet been released due to an abnormality occurring in the operation of the electromagnetic locking device 52 (that is, NO), the indicator lamp 53 is driven to indicate an abnormality of the steering wheel unlock switch to warn the driver to that effect (step S8), and thereafter the immobilizer unit 2 returns to its standby mode (step S100).

On the other hand, when it is determined that the electromagnetic locking device 52 has performed the unlocking operation normally to release the locking of the steering wheel (that is, YES), the control flow proceeds to the following operation shift mode.

First of all, a collation stand-by time Ts is set in the immobilizer control part 22 and the ECU 3 (step S9), and it is determined whether the starter switch 42 has been turned on by the driver (step S10).

When it is determined in step S10 that the starter switch 42 has been turned on (that is, YES), the system relay 6 is driven (step S11), so that the ECU 3 is thereby started (step S13).

On the other hand, when it is determined in step S10 that the starter switch 42 remains in an off state (that is, NO), a further determination is made as to whether the collation stand-by time Ts set in step S9 has elapsed (step S12).

When it is determined in step S12 that the collation stand-by time Ts has elapsed (that is, YES), it is decided that the driver has no will to start the two-wheeled vehicle, and the immobilizer unit 2 returns to its standby mode (step S100), whereas when it is determined that the collation stand-by time Ts has not yet elapsed (that is, NO>), a return is performed to the processing of determining whether the starter switch 42 has been turned on (step S10).

When the starter switch 42 is turned on, the ECU 3 is started in step S13, so that it sends a question code to the immobilizer control part 22 through the communications line 100 (step S14).

Subsequently, the immobilizer control part 22 determines whether it has received the question code from the ECU 3 (step S15). When it is determined that the question code has been received by the immobilizer control part 22 (that is, YES), an encryption key code is sent from the immobilizer control part 22 to the ECU 3 (step S16), whereas when it is determined in step S15 that the question code has not been received (that is, NO), a determination is further made as to whether the collation stand-by time Ts set in step S9 has elapsed (step S17).

When it is determined that the collation stand-by time Ts has not yet elapsed in step S17 (that is, NO), a return is performed to the question code reception determining processing (step S15), whereas when it is determined that the collation stand-by time Ts has elapsed (that is, YES), it is decided that the ECU 3 is in failure, so that the indicator lamp 53 is driven to indicate an abnormality in the starting of the ECU 3 (step S18), thus warning the driver to that effect, and thereafter the immobilizer unit 2 stops the driving of the system relay 6 (step S19), and returns to its standby mode (step S100).

Subsequently, following the processing of sending the encryption key code from the immobilizer control part 22 to the ECU 3 (step S16), the ECU 3 determines whether the encryption key code has been received from the immobilizer control part 22 (step S20).

When it is determined in step S20 that the encryption key code has not been received (that is, NO), a return is carried out to the step S20 where the encryption key code reception determining processing is repeated, whereas when it is determined that the encryption key code has been received (that is, YES), the ECU 3 collates the encryption key code currently received with the question code that has previously been sent (step S14) so as to determine whether they coincide with each other (step S21).

When it is determined in step S21 that both of these codes do not coincide with each other (that is, NO), a return is performed to the step S20 where the encryption key code reception determining processing is repeated, whereas when it is determined that both of the codes coincide with each other (that is, YES), the ECU 3 sends a response or acknowledgement code to the immobilizer control part 22 (step S22).

Subsequently, the immobilizer control part 22 determines whether it has received the acknowledgement code from the ECU 3 (step S23), and when it is determined that the acknowledgement code has been received (that is, YES), it is decided that the collation between the immobilizer control part 22 and the ECU 3 has been completed, thus permitting the engine operation (step S24), and the processing routine of FIG. 4 is ended.

On the other hand, when it is determined in step S23 that the acknowledgement code has not been received (that is, NO), a determination is further made as to whether the collation stand-by time Ts set in step S9 has elapsed (step S25).

When it is determined in step S25 that the collation stand-by time Ts has not yet elapsed (that is, NO), a return is performed to the acknowledgement code reception determining processing (step S23), whereas when it is determined that the collation stand-by time Ts has elapsed (that is, YES), it is decided that the ECU 3 is in failure, so that the indicator lamp 53 is driven to indicate an abnormality in the reception of the acknowledgement code (step S26), thus warning the driver to that effect, and thereafter the immobilizer unit 2 stops the driving of the system relay 6 (step S19), and returns to its standby mode (step S100).

Figure 5:
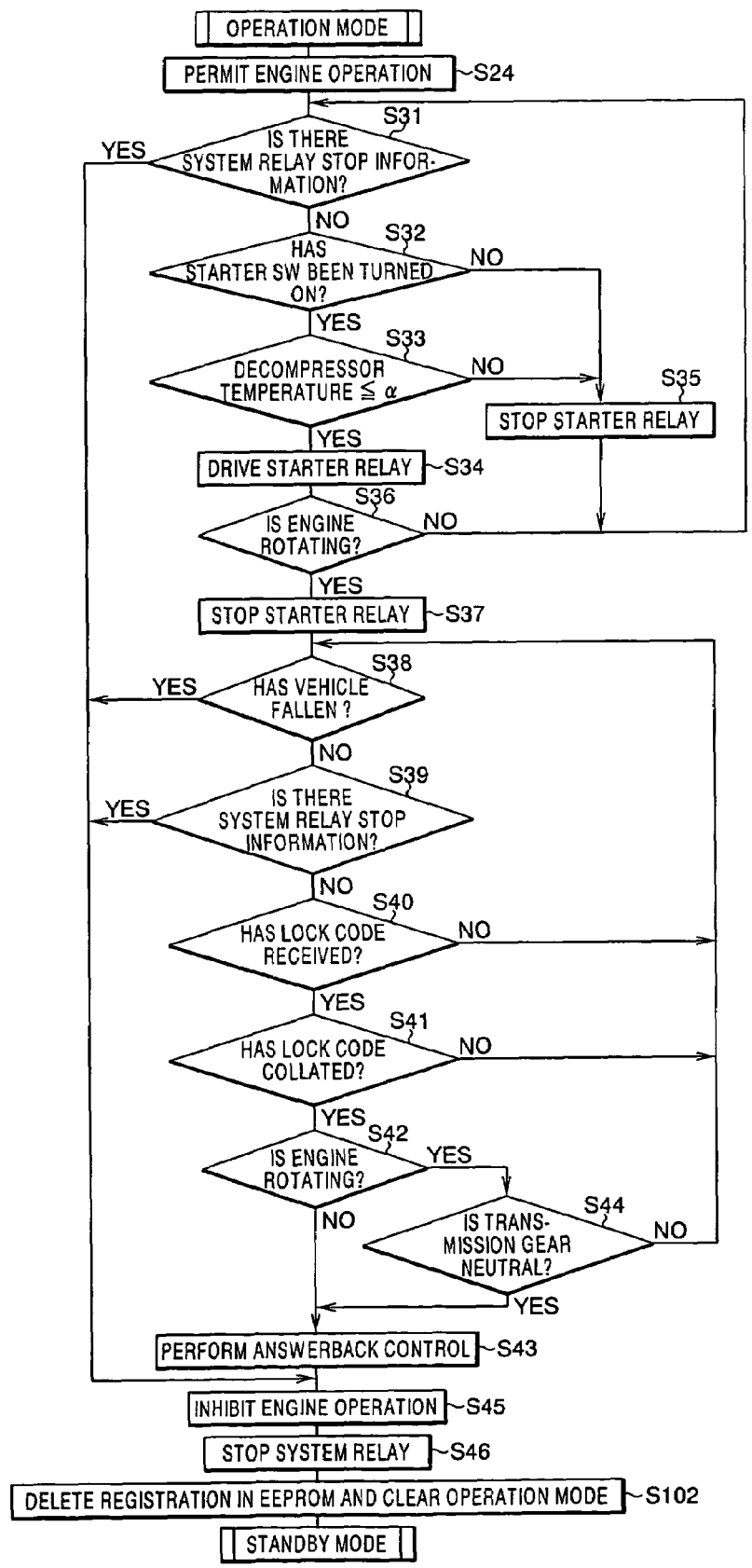
FIG. 5 is a flow chart showing a processing operation from an operation permitted state up to a standby mode of a vehicle-mounted engine according to the embodiment of the present invention.

Now, the processing operation of the immobilizer unit 2 and the ECU 3 in which they shifts from the engine operation permission state to the standby mode through the engine operation mode will be concretely explained while referring to a flow chart of FIG. 5.

In FIG. 5, step S24 is an engine operation permission processing similar to the above-mentioned one (see FIG. 4).

First of all, in the engine starting permitted state of the operation mode (step S24), the immobilizer unit 2 determines whether there is a piece of stop (off) information on the system relay 6 (i.e., information on the turning off of the system relay 6)(step S31).

Here, it is to be noted that the stop information on the system relay 6 corresponds, for example, to the information "The engine is not run even if a predetermined time has elapsed after generation of engine operation permission".

When it is determined in step S31 that there is the stop information on the system relay 6 (that is, YES), the engine operation is not permitted but inhibited (step S45), and the system relay 6 is turned off (step S46). At the same time, the permission information registered in the EEPROM 200 is deleted, and the operation mode is cleared (step S102) and the immobilizer unit 2 shifts to its standby mode.

On the other hand, when it is determined in step S31 that there is no stop information on the system relay 6 (that is, NO), a determination is further made as to whether the starter switch 42 has been turned on (step S32).

When it is determined in step S32 that the starter switch 42 has been turned on (that is, YES), it is then further determined whether the temperature of the decompressor (e.g., a supplementary decompression mechanism used upon starting of a high compression engine in a vehicle such as a two-wheeled vehicle, an outboard machine, etc.) is lower than or equal to a predetermined value α step S33). When the decompressor temperature is determined to be lower than or equal to the predetermined value α (that is, YES), the starter relay 41 is driven to be tuned on (step S34).

On the other hand, when it is determined in step S32 that the starter switch 42 has not been turned on (that is, NO), or when it is determined in step S33 that the decompressor temperature exceeds the predetermined value α (that is, NO), the starter relay 41 is stopped to protect the decompressor (step S35), and a return is performed to the processing of determining the presence or absence of the system relay stop information (step S31).

Subsequently, after the driving of the starter relay 41 in step 34, the immobilizer control part 22 determines based on the rotation detection signal from the crank angle sensor 57 whether the engine is rotating (step S36).

When it is determined in step S36 that the engine is not rotating but stalled (that is, NO), a return is performed to the processing of determining the presence or absence of the system relay stop information (step S31), whereas when the engine is determined to be rotating (that is, YES), the starter relay 41 is driven to be stopped or turned off (step S37).

Following the stop processing of the starter relay 41 (step S37), with the engine being run in this manner, the immobilizer control part 22 determines, based on the detection signal from the fall sensor 72, whether the two-wheeled vehicle has fallen (step S38).

When it is determined in step S38 that the two-wheeled vehicle has fallen (that is, YES), the control flow proceeds to a non-permission or inhibition processing of the engine operation (step S45) where the operations of the actuators 71 are changed, e.g., the ignition signal to each ignition coil or the fuel supply to engine cylinders is interrupted.

In addition, as described above, the system relay 6 is turned off (step S46), and the permission information registered in the EEPROM 200 is deleted to clear the operation mode (step S102), whereby the immobilizer unit 2 shifts to its standby mode.

On the other hand, when it is determined in step S38 that the two-wheeled vehicle has not fallen (that is, NO), a determination is then made as to whether there is stop information on the system relay 6 (i.e., the engine stall continues for a predetermined time) (step S39).

When it is determined in step S39 that there is stop information on the system relay 6 (that is, YES), the control flow proceeds to a non-permission or inhibition processing of the engine operation (step S45), whereas when it is determined that there is no stop information on the system relay 6 (that is, NO), the control flow proceeds to the following determination processing (step S40).

In step S40, according to the driver's turning-on operation of the lock button 13, it is determined whether the receiver circuit 21 in the immobilizer unit 2 has received a third ID code (LOCK code) sent from the portable transmitter 1.

When it is determined in step S40 that the third ID code has not been received (that is, NO), the control flow returns to the fall determining processing (step S38), whereas when it is determined that the first ID code has been received (that is, YES), the received third ID code is collated with the fourth ID code stored in advance in the EEPROM 200 in the immobilizer control part 22 so as to determine whether they coincide with each other (step S41).

When it is determined, as a result of the collation in step S41, that both of these codes do not coincide with each other (that is, NO), the control flow returns to the fall determining processing (step S38), whereas when it is determined that both of the codes coincide with each other (that is, YES), a determination is then made based on the rotation detection signal of the crank angle sensor 57 as to whether the engine is rotating (step S42).

When it is determined in step S42 that the engine is not rotating but stalled (that is, NO), the control flow proceeds to an answerback control (step S43) for driving the hazard relay 54 or the warning buzzer 55 for the purpose of warning, and then the immobilizer unit 2 shifts to its standby mode after the processing of inhibiting the engine operation (step S45), the processing of turning off the system relay 6 (step S46) and the processing of clearing the EEPROM 200 (step S102) have been executed.

On the other hand, when it is determined in step S42 that the engine is rotating (that is, YES), a determination is subsequently made as to whether the transmission gear of the two-wheeled vehicle is in a neutral state (step S44). When it is determined that the transmission gear is in a neutral state (that is, YES), the control flow proceeds to the above-mentioned answerback control (step S43), whereas when it is determined that the transmission gear is not in a neutral state (that is, NO), it is decided that the driver is still operating the vehicle, and a return is performed to the fall determining processing (step S38).

Next, reference will be made to a warning operation upon the occurrence of a theft according to the embodiment of the present invention while referring to a flow chart of FIG. 6.

Figure 6:
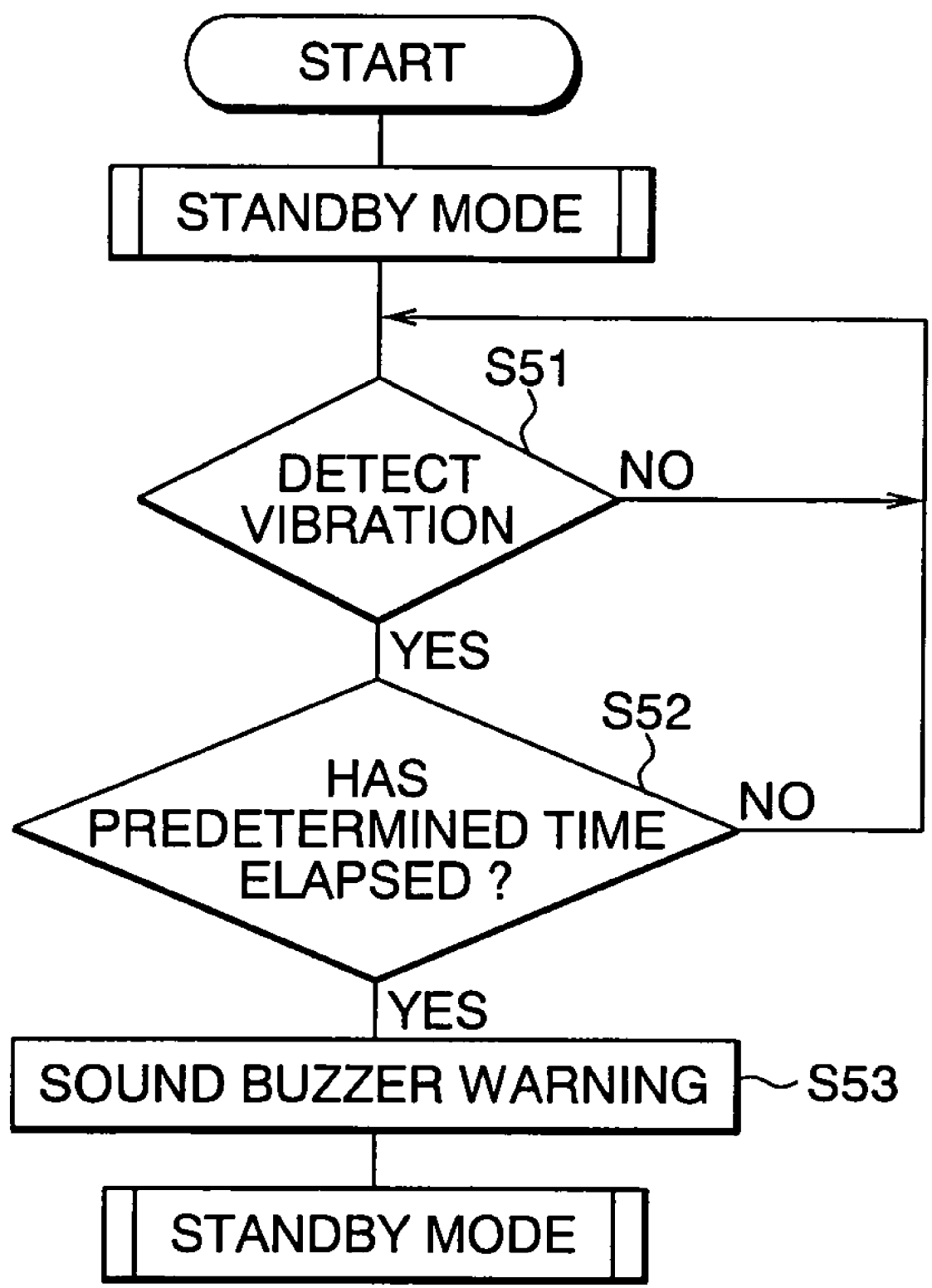
FIG. 6 is a flow chart showing a warning operation according to the embodiment of the present invention.

FIG. 6 shows a processing routine at the time of an immobilization mode (that is, the engine operation is in a non-permission or inhibition mode).

In FIG. 6, first of all, the immobilizer control part 22, being in its standby mode, determines based on the presence or absence of a detection signal from the vibration sensor 56 whether the vibration generated upon the theft of the two-wheeled vehicle has been detected (step S51).

When it is determined in step S51 that there has been detected no such vibration (that is, NO), a return is performed to the step S51 where the processing of determining the presence or absence of vibration is repeated, whereas when it is determined that there has been detected the vibration (that is, YES), a determination is further made as to whether the vibration has continued over a predetermined time (i.e., the predetermined time has elapsed with the vibration being detected) (step S52).

When it is determined in step S52 that the vibration has not continued over the predetermined time (that is, NO), a return is carried out to the step S51, whereas when it is determined that the vibration has continued over the predetermined time (that is, YES), it is decided that the theft of the two-wheeled vehicle has occurred, so that the warning buzzer 55 is driven to warn the occurrence of the theft to the surroundings around the two-wheeled vehicle (step S53), and the immobilizer unit 2 returns to its standby mode.

Thus, even if a contact failure or the like in a feeder line of the vehicle-mounted battery 8 is generated to cause instantaneous disconnection of the feeder line connected between the vehicle-mounted battery 8 and the immobilizer unit 2, by determining whether the information currently registered in the EEPROM 200 of the immobilizer control unit 22 is in an operation mode (step S100), it is possible to promptly resume the operation of the vehicle in a minimum time without performing repeated transmissions of information for driving the engine when the information in the EEPROM 200 indicates the operation mode.

In addition, in case where an instantaneous power interruption takes place at the time when a ship is coming alongside a pier, a marine engine such as jet propulsion equipment or the like of the ship is stopped, and hence there is a possibility that the hull of the ship quipped with a conventional antitheft device might be caused to advance to collide with the pier under the action of inertia. In such a case, however, according to the present invention, it is possible to shorten the time required to restart the engine by referring directly to the information stored in the EEPROM 200 without repeating the collation of the ID code. As a result, even where the present invention is applied to marine engines, collisions or the like can be avoided in a reliable manner.

Although in the above-mentioned embodiment, the present invention has been described as being applied to a two-wheeled vehicle, it is applicable to other vehicles propelled by the driving force of an engine, such as motor cars, motor ships, jet propulsion boats, etc.

Also, it goes without saying that the present invention can be applied to any systems in which by the use of a key having a transponder installed thereon, immobilizer control is effected through an ID code generated when the key is inserted into a corresponding key cylinder.

While the invention has been described in terms of a preferred embodiment, those skilled in the art will recognize that the invention can be practiced with modifications within the spirit and scope of the appended claims.

What is claimed is:

1. An antitheft device for a vehicle which is propelled by a driving force of an engine,
    said device comprising:
    an operation-equipment limiting part disposed at a vehicle for limiting the operation of operation equipment for said vehicle through external operation;
    a first switch adapted to be turned on from the outside to send a first prescribed ID code;
    an operation-equipment operation determining part that receives said first ID code to generate permission information for releasing a limited state of said operation equipment caused by said operation-equipment limiting part;
    a nonvolatile memory for storing said permission information; and
    an engine operation limiting part that permits the operation of said engine in response to said permission information, and limits the operation of said engine based on an operating state of said engine;
    wherein said operation-equipment operation determining part stores in advance a second ID code corresponding to said first ID code, collates said first ID code with said second ID code, and generates said permission information thereby to permit the operation of said operation equipment as well as to make said permission information stored in said nonvolatile memory, when the collation result of said first and second ID codes indicates coincidence therebetween, and
    said operation-equipment operation determining part permits the operation of said engine by using said permission information in said nonvolatile memory, when said engine is restarted in a predetermined time after generation of said permission information, and
    wherein said permission information is deleted when use of said vehicle is stopped.

2. The antitheft device for a vehicle as set forth in claim 1, wherein
    said first switch includes a key and a key cylinder for said vehicle; and said first ID code is sent by said key's being inserted into said key cylinder.

3. The antitheft device for a vehicle as set forth in claim 1, further comprising:
    a vibration sensor for detecting the generation of vibration to generate a detection signal; and
    a warning generating part for generating a warning in response to the detection signal generated by said vibration sensor;
    wherein in case where the operation of said engine is placed in a limited state by said engine operation limiting part, said warning generating part generates said warning when said vibration sensor detects vibration.

4. The antitheft device for a vehicle as set forth in claim 1, wherein said engine operation limiting part limits the operation of said engine by interrupting an ignition signal or a fuel supply signal for said engine.

5. The antitheft device for a vehicle as set forth in claim 1, wherein said engine operation limiting part limits the operation of said engine when the state of said engine shifts from an operating state into a stopped state.

6. The antitheft device for a vehicle as set forth in claim 1, wherein said engine operation limiting part limits the operation of said engine when the state of said engine does not shift to an operating state even if said predetermined time has elapsed after generation of said permission information.

7. The antitheft device for a vehicle as set forth in claim 1, wherein said operation-equipment limiting part is not portable.

8. An antitheft device for a vehicle which is propelled by a driving force of an engine,
    said device comprising:
    an operation-equipment limiting part for limiting the operation of operation equipment for said vehicle through external operation;
    a first switch adapted to be turned on from the outside to send a first prescribed ID code;
    an operation-equipment operation determining part that receives said first ID code to generate permission information for releasing a limited state of said operation equipment caused by said operation-equipment limiting part;
    a nonvolatile memory for storing said permission information; and
    an engine operation limiting part that permits the operation of said engine in response to said permission information, and limits the operation of said engine based on an operating state of said engine;
    wherein said operation-equipment operation determining part stores in advance a second ID code corresponding to said first ID code, collates said first ID code with said second ID code, and generates said permission information thereby to permit the operation of said operation equipment as well as to make said permission information stored in said nonvolatile memory, when the collation result of said first and second ID codes indicates coincidence therebetween,
    and said antitheft device further comprising a second switch adapted to be turned on from the outside to send a third prescribed ID code;

wherein said operation-equipment operation determining part stores in advance a fourth ID code corresponding to said third ID code, collates said third ID code with said fourth ID code, generates limitation information for limiting the operations of said engine and said operation equipment and deletes the permission information in said nonvolatile memory, when the collation result of said the third and fourth ID codes indicates coincidence therebetween, and said operation-equipment operation determining part permits the operation of said engine by using said permission information in said nonvolatile memory, when said engine is restarted in a predetermined time after generation of said permission information, wherein said permission information is deleted when use of said vehicle is stopped; and wherein said engine operation limiting part limits the operation of said engine in response to said limitation information.

9. The antitheft device for a vehicle as set forth in claim 8, wherein said operation-equipment limiting part comprises an electromagnetic locking device.

10. The antitheft device for a vehicle as set forth in claim 8, wherein said first and second switches generate instruction information corresponding to a plurality of functions to said operation-equipment operation determining part.

11. The antitheft device for a vehicle as set forth in claim 8, wherein said first and second switches are arranged inside a portable transmitter isolated from said operation-equipment operation determining part.

* * * * *